US009582674B2

(12) United States Patent
Cheng et al.

(10) Patent No.: US 9,582,674 B2
(45) Date of Patent: *Feb. 28, 2017

(54) RISK ADAPTIVE INFORMATION FLOW BASED ACCESS CONTROL

(71) Applicant: International Business Machines Corporation, Armonk, NY (US)

(72) Inventors: Pau-Chen Cheng, Yorktown-Heights, NY (US); Pankaj Rohatgi, Los Altos, CA (US); Claudia Keser, Yorktown Heights, NY (US); Josyula R. Rao, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/101,063

(22) Filed: Dec. 9, 2013

(65) Prior Publication Data

US 2014/0101753 A1  Apr. 10, 2014

Related U.S. Application Data

(63) Continuation of application No. 11/623,838, filed on Jan. 17, 2007, now Pat. No. 8,650,623.

(51) Int. Cl.
*G06F 21/60* (2013.01)
*G06F 21/62* (2013.01)
(Continued)

(52) U.S. Cl.
CPC ............ *G06F 21/604* (2013.01); *G06F 21/62* (2013.01); *G06Q 10/06* (2013.01); *G06Q 30/0601* (2013.01)

(58) Field of Classification Search
CPC ....... G06F 21/62; G06F 21/604; G06Q 10/06; G06Q 30/0601
(Continued)

(56) References Cited

U.S. PATENT DOCUMENTS 6,430,561 B1   8/2002  Austel et al.
7,747,736 B2 *  6/2010  Childress ............. G06Q 10/063
                                                  705/7.11
(Continued)

OTHER PUBLICATIONS

A new method for estimating value-at-risk of Brady bond portfolios, Dvari et al, Computational Intelligence for Financial Engineering, 1999. (CIFEr) Proceedings of the IEEE/IAFE 1999 Conference, IEEE Apr. 27-27, 1999.*
(Continued)

*Primary Examiner* — Luu Pham
*Assistant Examiner* — Jahangir Kabir
(74) *Attorney, Agent, or Firm* — Patent Portfolio Builders PLLC

(57) ABSTRACT

Systems and methods are provided to manage risk associated with access to information within a given organization. The overall risk tolerance for the organization is determined and allocated among a plurality of subjects within the organization. Allocation is accomplished using either a centralized, request/response or free market mechanism. As requested from subjects within the organization for access to objects, i.e. information and data, are received, the amount of risk or risk level associated with each requested is quantified. Risk quantification can be accomplished using, for example, fuzzy multi-level security. The quantified risk associated with the access request in combination with the identity of the object and the identity of the subject are used to determine whether or not the request should be granted, denied or granted with appropriated mitigation measures.

20 Claims, 2 Drawing Sheets

(51) Int. Cl.
*G06Q 10/06* (2012.01)
*G06Q 30/06* (2012.01)

(58) Field of Classification Search
USPC ......... 726/5, 18, 25; 705/26.1; 713/153, 157
See application file for complete search history.

(56) References Cited

U.S. PATENT DOCUMENTS

| | | | |
|---|---|---|---|
| 7,930,195 B2 * | 4/2011 | Heyns .................... | G06Q 10/06 |
| | | | 705/35 |
| 8,572,755 B2 * | 10/2013 | Odins-Lucas .......... | G06F 21/51 |
| | | | 709/225 |
| 8,826,154 B2 * | 9/2014 | Dixon .................... | G06Q 10/06 |
| | | | 715/760 |
| 2003/0154393 A1 | 8/2003 | Young | |
| 2003/0195830 A1 | 10/2003 | Merkoulovitch et al. | |
| 2004/0143753 A1 * | 7/2004 | Hernacki ................ | H04L 63/14 |
| | | | 726/25 |
| 2005/0075972 A1 * | 4/2005 | Doyle .................. | G06Q 40/025 |
| | | | 705/38 |
| 2005/0232423 A1 * | 10/2005 | Horvitz et al. ............... | 380/255 |
| 2005/0278786 A1 * | 12/2005 | Tippett ................ | H04L 63/1416 |
| | | | 726/25 |
| 2006/0253709 A1 * | 11/2006 | Cheng .................. | G06F 21/577 |
| | | | 713/182 |
| 2007/0094260 A1 * | 4/2007 | Murphy et al. .................... | 707/9 |
| 2007/0094491 A1 * | 4/2007 | Teo ..................... | H04L 63/1408 |
| | | | 713/153 |
| 2007/0143827 A1 | 6/2007 | Nicodemus et al. | |
| 2007/0214151 A1 * | 9/2007 | Thomas ................. | H04L 63/14 |
| 2008/0005223 A1 | 1/2008 | Flake et al. | |

OTHER PUBLICATIONS

An Adaptive Procedure for Estimating Coherent Risk Measures Based on Generalized Scenarios, Lesenevski et al, Simulation Conference, IEEE 2006.*
"Horizontal Integration: Broader Access Modles for Realizing Information Dominence", JASON Program Office, JSR-04-132, MITRE Corporation 2004.
Bell and Lapadula, "Computer Security Modle: Unified Exposition and Multics Interpretation", Technical Report ESD-TR-306, MITREE Corp., Bedford, MA Jun. 1975.

* cited by examiner

RISK ADAPTIVE INFORMATION FLOW BASED ACCESS CONTROL

CROSS-REFERENCE TO RELATED APPLICATIONS

The present invention is a continuation of co-pending U.S. patent application Ser. No. 11/623,838 filed Jan. 17, 2007. The entire disclosure of that application is incorporated herein by reference.

STATEMENT REGARDING FEDERALLY SPONSORED RESEARCH

The invention disclosed herein was made with U.S. Government support under Contract No. TIA H98230-05-3-0001 awarded by the U.S. Department of Defense. The Government has certain rights in this invention.

FIELD OF THE INVENTION

The present invention relates to access control within a computing system.

BACKGROUND OF THE INVENTION

The traditional multi-level secure (MLS) mandatory access control is based on the Bell-LaPadula model, which is described in David E. Bell and Leonard J. LaPadula, *Computer Security Model: Unified Exposition and Multics Interpretation*, Technical Report ESD-TR-75-306, The MITRE Corporation, Bedford, Mass., HQ Electronic Systems Division, Hanscom AFB, Mass., June (1975). In the Bell-LaPadula model, each subject or object is tagged with a <sensitivity_level(SL), categories_set(CS)>tuple. All such tuples in a system form a partial-order relation set where $<SL_1, CS_1> \geq <SL_2, CS_2>$ IFF $SL_1 \geq SL_2$ and $CS_1 \supseteq CS_2$. Information can flow from a source to a destination only if $tag_{destination} \geq tag_{source}$. The source or destination can be either a subject or object. Therefore, a subject can read an object only if $tag_{subject} \geq tag_{object}$. A subject is usually a person or an application running on behalf of a person. The sensitivity level associated with a subject reflects the degree of trust placed in the subject. The categories set associated with the subject specifies the categories of objects the subject has a need to know or to access. A subject's sensitivity level is also called the subject's clearance.

An object can be a data storage element such as a file or a data transportation apparatus such as a network connection. The sensitivity level associated with an object indicates how sensitive the data contained in that object are or the magnitude of the damage incurred by an unauthorized disclosure of the data. The categories set associated with the object specifies the categories to which the data belong.

The traditional MLS model has been in practice since before computers came into wide existence. The MLS model is easy to understand and facilitates easy access control decisions based on the model by simply comparing two tags. Thus, the MLS model provides a basis for quantification of the risk associated with allowing subjects access to objects. If the tags associated with a subject and an object correctly reflect the subject's trustworthiness and need-to-know and the object's sensitivity and categories, then the access control decision is likely to avoid leakage of the information in the object and therefore the risk associated with such leakage. In short, the model is geared toward risk avoidance.

In many organizations, especially organizations in the national security and intelligence arena, the ability to rapidly process, share and disseminate large amounts of sensitive information in order to support informed decision making to rapidly respond to external events is important to the central mission of those agencies. Current access control models, includes MLS models, do not provide a sufficient level of flexibility to deal with the dynamic environments and needs of these organizations. For example, a complex organization with multiple, hierarchically organized departments, each holding information and data needs to be able to organize and share this information among the various departments. Understanding the significance of isolated events and formulating an effective response may require users and management in the organization to pool together information available within multiple departments, i.e., to "connect the dots". The information that needs to be pooled together would depend on the external event and the analysis approach adopted, which cannot be predicted in advance.

Traditional access control policies based on roles aligned with the organizational chart can degrade the effectiveness of the response. Studies of such organizations have concluded that existing security policy models are too rigid and do not allow necessary information to be shared. An example of a study is found in *HORIZONTAL INTEGRATION: Broader Access Models for Realizing Information Dominance*, JASON Program Office, JSR-04-132, MITRE Corporation (2004). As a reaction, some organizations have set up a complex mix of loose and ad-hoc policies that may result in an unaccountable risk of information leakage. The problem is due to the fact that existing access control policies specify access decisions statically, and the environments in which the policies are applied are dynamic. Thus the ideal case where an organization continually optimizes access control based on risk vs. benefit trade-offs while capping overall risk cannot be realized.

SUMMARY OF THE INVENTION

Systems and methods in accordance with the present invention utilize a risk and information flow based access control model based on a risk management approach. The risk associated with a given access to information is quantified and controlled. Even risky information flows needed by a user can be allowed provided that the associated risk can be accounted for and controlled. Information sharing and prudent risk-taking behavior is encouraged among subjects or users to maximize the benefit to the organization while at the same time keeping subjects or users accountable for their actions and capping the expected damage an organization could suffer due to sensitive information disclosure. In addition, organizations are able to control risky information flows dynamically based on current operational needs and real-time environmental parameters.

In one exemplary method for access control in accordance with the present invention, a pre-determined quantity of total risk units for an entire organization or computing system is allocated among a plurality of subjects in the organization. This allocation of risk units can be based upon a reputation associated with each one of the plurality of subjects to which the risk units are to be allocated. These reputations are based on a value to the organization of results obtained by each subject and a helpfulness of each subject to other subjects within the organization. A reputation management system is used to maintain the reputation associated with each one of the plurality of subjects. Creation and maintenance of the reputation management system includes using a pier review evaluation system to affect the reputation associated with each one of the plurality of subjects.

Allocation of the risk units is accomplished using either a centralized allocation method, a request and response allocation method or a free market allocation method. In the centralized method, a central authority is used to determine the total amount of risk units and an allocation of risk units for each one of the plurality of subjects. In the request and response method, a request from one of the plurality of subjects is communicated to the central authority for a given allocation of risk units. In addition, a justification for the requested allocation of risk units is communicated to the central authority. The central authority using the justification determines whether to grant or to denial of the risk unit allocation request.

In the free market allocation approach, the central authority again determines the total amount of risk units for the entire organization and an initial allocation of the total risk units among each one of the plurality of subjects. The subjects can then exchange risk units directly between subjects as needed or desired without the assistance or intervention of the central authority. For example, the number of risk units required from the requesting subject for the requested object access is determined based upon the quantified risk level for that access, and the required risk units are compared to the initial allocation of risk units for the requesting subject. Any required additional risk units are obtained directly from at least one additional subject.

For two subjects, a given or desired number of risk units is communicated from a first subject to a second subject. In exchange for the risk units, an appropriate amount of currency is communicated from the second subject to the first subject. A currency account management system containing a currency account for each one of the plurality of subjects is maintained. The currency in these currency accounts is used as compensation when exchanging risk units. In general, currency is allocated to subjects, for example from the central authority, as compensation for prudent risk taking. In addition to exchanging currency for risk units, currency is exchanged for rewards, e.g., monetary rewards. Risk unit exchanges are not limited to two party exchanges but can involve joint actions or joint ventures among a plurality of subjects. For example, risk units from two or more subjects are placed into a common pool of risk units to be used by any member of the group of subjects.

Having allocated the risk units among the subjects, a request from one of the plurality of subjects for access to an object is received, for example at the central authority. A risk level associated with the requested object access is quantified. Attributes of the object and attributes of the subject can be used to quantify the risk level. In addition, fuzzy multi-level security is used to quantify the risk associated with the request.

The requested object access is then granted or denied based on at least one of the quantified risk level and an amount of risk units allocated to the requesting subject. For example, an upper boundary and a lower boundary for risk levels associated with a given access request are identified. Access requests having a risk level greater than or equal to the upper boundary are denied, and access requests having a risk level less than or equal to the lower boundary are granted. For access requests having a risk level greater than the lower boundary and less than the upper boundary, these requests are granted with the requirement of additional mitigation measures. The mitigation measures are sufficient to decrease the risk level associated with the access request to a level less than or equal to the lower boundary. These mitigation measures include application sandboxing and charging the associated risk level to the amount of risk units allocated to the requesting subject.

DETAILED DESCRIPTION

Systems and methods in accordance with the present invention allocate a risk quota among a plurality of individual users consistent with the overall risk tolerance and goals of a given organization or computing system. In general, for a given exchange or access of information by a given user, the risk associated with that exchange is estimated based on the information accessed and the security attribute of the user. The security attribute includes the user's identity and other information such as the user's tag as described in David E. Bell and Leonard J. LaPadula, *Computer Security Model: Unified Exposition and Multics Interpretation*, Technical Report ESD-TR-75-306, The MITRE Corporation, Bedford, Mass., HQ Electronic Systems Division, Hanscom AFB, Mass., June (1975). Each user is allocated a prescribed risk quota consistent with the overall risk tolerance and goals of the organization.

Figure 1:
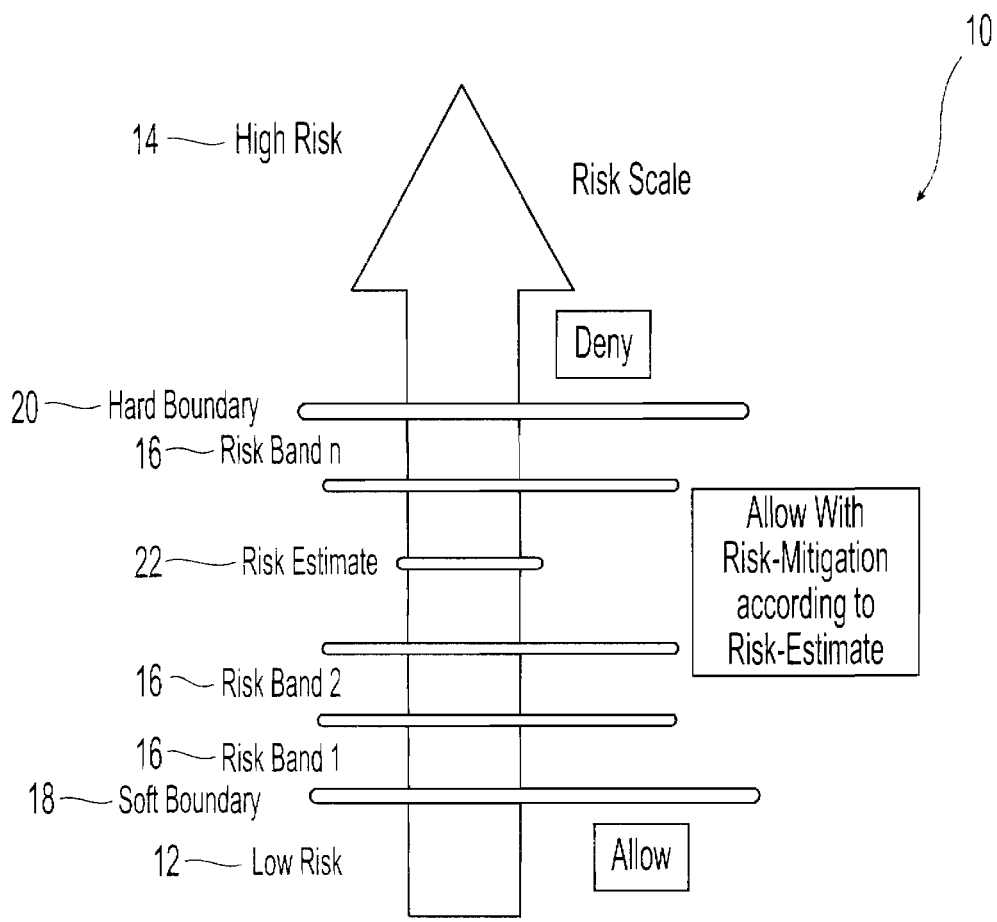
FIG. 1 is a schematic representation of an embodiment of a risk scale for use in accordance with the present invention.

Having estimated the risk, access to that information is allowed or denied based upon a comparison between the estimated risk associated with the access and the amount of risk that has been allocated to the user. In one embodiment, static access control models with binary decision states, e.g. allow access or deny access, are replaced by a dynamic, multi-level decision access model based on risk-quantification and the current risk tolerance of the organization. Referring to FIG. 1, an exemplary embodiment of a risk scale 10 representing the range of quantified risk is illustrated. The range of quantified risk extends from a low risk 12 to a high risk 14 and is further divided into a plurality of risk bands 16 that reflect the current risk tolerance. The quantified risk estimate for any information access falls into one of these risk bands. In one embodiment, each band is associated with a decision and an action. For example, a given band would be associated with a decision either to allow access to the information or to deny access to the information. If the associated decision is to allow access, the band can be further associated with an action such as auditing the access and the user's further behavior. A static access control model would place the bands in either one of two categories, allow access or deny access. Existing static access control models, for example multi-level secure (MLS) models, predefine just two bands and err on the side of safety by allowing access only in the bottom band.

As illustrated, the risk bands produce more than a binary access decision. Two risk boundaries are defined, a lower or soft boundary 18 and an upper or hard boundary 20. Risk bands that fall above the hard boundary are associated with the decision to deny access. Risk bands that fall below the soft boundary are associated with the decision to allow access. For a given risk estimate 22 that falls in a risk band disposed between the soft boundary or hard boundary, the associated decision would be to allow access with additional risk mitigation measures. These mitigation measures include, but are not limited to increased auditing, application sandboxing and charging the risk taken to a risk quota allocated to the user. Therefore, the decision model is not simply a binary system but includes the decisions allow, deny and allow with a charge against the user's risk quota and potentially additional risk mitigation measures, based on risk of access and current risk tolerance. Preferably, the mitigation measures reduce the current risk estimate to a level below the soft boundary. A suitable method for quantifying the risk estimate, called FuzzyMLS, and using this risk estimate in a risk scale having more than two decision levels is described in U.S. patent application Ser. No. 11/123,998 filed May 6, 2005.

Through risk estimation, for example using FuzzyMLS, in combination with an allocation of an organization-wide risk tolerance among a plurality of users, an organization continually optimizes risk and benefit trade-offs with regard to information access. Risk is treated as countable, i.e. quantifiable, units of resources that can be allocated among a plurality of users in an optimal way that is aligned with the overall needs and risk tolerance of an organization. This estimation and allocation of risk can be examined from the perspectives of the user, the user's supervisors and the security administrator.

From a user perspective, each user is assigned a risk quota that allows that user to take calculated risks. A risk quota can be viewed as a flexible and bigger sandbox compared to traditional access control models. A bigger sandbox means that many accesses that would be denied by a traditional MLS policy are now allowed with risk mitigation measures. The user can choose the information accesses where extra risk should be taken. This provides the user with increased flexibility to allocate the assigned risk quota to gain additional information about topics that are most relevant to the immediate needs of that user and that are most likely to deliver better results to both the user and the organization. In one embodiment, the user-determined allocation of assigned risk is accomplished without asking for approval from a centralized entity within the organization. Exceptional accesses are accompanied by additional risk-mitigation measures such as increased auditing and accountability and depletion of risk quota, creating a strong disincentive for misuse.

From a supervisor perspective, calculated risk-taking behavior by users is encouraged, without the need for approving requests for exceptional accesses. However, supervisors will have to ensure that risk-taking behaviors of users are aligned with the organization's benefit. For example, users are rewarded for beneficial results achieved through risk-taking. Alternatively, the risk allocation strategy is adjusted based on the effectiveness of a given user in utilizing the assigned risk quota to benefit the organization.

A security administrator manages the security policies of the organization, assigns rights to the users and manages the security risks taken by the organization. Even a well constructed security policy becomes fairly loose as temporary needs of users for accesses outside the policy result in modifications to the policy and granting of long term access rights to users for short term needs. Over time, these extra rights get difficult to track. Therefore, the ability of the security administrator to assess the security risks being taken by the organization decreases over time. Systems and methods in accordance with the present invention, however, contain flexibility provided by the risk-based security policy model that significantly mitigates this problem since the basic organization policy does not have to be constantly updated and altered based on temporary needs of users. While the security administrator has to set up the risk policy in addition to the basic security policy, the effort is in the initial setup.

The following features of the risk based model allow for a security administrator to manage the risks taken by the organization over the long term. The access control policy has flexibility to accommodate the particular needs of each user, i.e., the bigger sandboxes. The total risk taken by the organization is bounded since the sandbox associated with every user is bounded. Risky accesses are accounted for and tracked by risk mitigation measures. This tracking and accounting is done in different degrees of detail according to the quantified risk associated with the accesses. There is little need for micro-management. For example, the settings of sandboxes are done in a way that coincides with the organizational hierarchy. The organization determines the maximum amount of risk to be taken, and this amount can be distributed down the hierarchy. A supervisor at a given level determines how to distribute the share of risk allocated to that supervisor down through the levels supervised by that supervisor. In addition, each user decides when to take calculated risks since it is to the benefit of that user to do so.

The risk posture of a given organization is adjusted by adjusting the boundaries, the decisions and the actions associated with the plurality of risk bands contained within the risk scale associated with that organization. These adjustments are not done locally in isolation but in the organization-wide context represented by the risk scale.

In accordance with one exemplary embodiment, risk is treated as countable units of resources that can be allocated in an optimal way that is aligned with the needs and risk tolerance of an organization. While there are many possible ways to determine the allocation of countable resources, three embodiments are described. The method selected to allocate the countable resources depends on the organizational setting and goals. In addition, each allocation approach does not have to be utilized in isolation but can be combined with other approaches to create a hybrid allocation approach. These three methods are a centralized top down method, a request/response method and a free market method.

In one embodiment, allocation is conducted using a centralized pre-planned risk unit allocation. A given organization, using institutional knowledge and best judgment, determines how much risk each employee or user is allowed to take and assigns that employee a number of risk units commensurate with that determination. In another embodiment, risk units are allocated in response to requests from users. For example, risk units are allocated to employees based on requests and justifications from these employees for given instances of risk-taking. A given request is either granted or denied by a centralized management structure. In the third embodiment, units of risk are exchanged through a free market mechanism. In this embodiment, the organization determines the total amount of risk units for the entire organization and an initial allocation of these units among all users within the organization. When a given user chooses an opportunity to pursue, the risk units needed to pursue that opportunity are identified. If the user has not been allocated a sufficient amount of risk units to pursue that opportunity, additional risk units are acquired through a market, where each user has the opportunity to buy and to sell risk units. Trades are based on a currency that includes the amount of currency available to all users and the initial allocation of the currency are determined by the organization. The currency can be either real or virtual.

In one embodiment, the number of risk units allocated to a given user is based on the reputation of the user. A stronger or more trustworthy reputation justifies a larger allocation. The reputation of a user is based on how valuable the results of the projects undertaken by that user are to the organization and how helpful that user is to other users within the organization. In one embodiment, the reputation associated with each user is maintained by a reputation management system. Suitable reputation management systems include, but are not limited to, a peer-review system through which each user can submit scores to rank other users.

Exemplary systems in accordance with the present invention include a risk account management mechanism to track the allocation and usage of risk units for each and every user within the organization. In one embodiment, risk units are credited to the account of a given user when these risk units are allocated to the user. Risk units are deducted from the account of that user when the user accesses objects. The number of risk units deducted equals the risk estimate associated with the access.

The system also includes a risk estimation mechanism to produce quantified risk estimates associated with user accesses to information or other resources. In one embodiment, the risk estimation mechanism utilizes FuzzyMLS to produce the quantified risk. A fair and objective evaluation mechanism is provided to evaluate the results of risk taking. A suitable evaluation mechanism encourages user to be prudent, to take calculated risks and to produce beneficial results for the organization. In addition, the evaluation mechanism allows the organization to learn from past experience to continuously improve organizational risk allocation strategy and to improve risk vs. benefit trade-offs.

In an embodiment where allocation is based upon a free market exchange of risk units, the system includes an open risk market mechanism to facilitate the exchange, i.e. buying and selling, of risk units among users. In one embodiment, the market mechanism is similar to a commodities trading market. In addition, the system includes a currency account management mechanism to track and to manage the amount of currency possessed by each user. A certain amount of currency (or dollars) is added to the currency account of each user during initial allocation. When the user sells some risk units and receives the price paid by the buyer, the price paid is added to the currency account of the user. Similarly, when the user buys some risk units and pays the price to the seller, the price is deducted from the currency account of the purchasing user. Periodically the results of a given risk usage is evaluated and translated into some amount of currency. This currency is credited to the currency account of that user. For every evaluation period, the currency account can be used in exchange for an award. This encourages users who are good at taking risk for the production of good results to take more risks and to produce more good results since these users can acquire rewards and can accumulate more currency to acquire more risk units.

In one embodiment of the free market risk unit exchange embodiment, user-defined or user-initiated joint ventures are created to pool the risk units and currency of two or more users in order to pursue an opportunity. For example, a first user A needs some risk units to pursue an opportunity within the domains of expertise associated with this user; however, the first user A does not possess sufficient currency to obtain the risk units necessary to pursue this opportunity. A second user B possesses spare risk units. The second user B invests these spare risk units in the first user A. The second user B will share in any reward given to the first user A if the opportunity pursued by the first user A is successful.

In one embodiment, the basic environment is an organization that utilizes the Bell-Lapadula model based Multi-Level Security (MLS) access control model. The basic premise of the Bell-Lapadula MLS model is to determine if a subject is trustworthy enough and has the legitimate need to access an object. A subject is usually a person or an application running on behalf of a person. An object is usually a piece of information such as a file. Each subject or object is tagged with a security label which is a <sensitivity_level,categories_set>tuple. A sensitivity level associated with a given subject reflects the degree of trust placed in that subject. A categories set associated with the subject specifies the categories of objects to which the subject has a legitimate need to access. The sensitivity level associated with an object indicates how sensitive that object is or the magnitude of the damage incurred by an unauthorized disclosure of the object. The categories set associated with that object specifies the categories to which the object belongs. All tuples in a system form a partial-order relation set with the "dominate" relationship which is defined as:

Let $SL_1$ and $SL_2$ be sensitivity levels and let $CS_1$ and $CS_2$ categories sets, then
$<SL_1,CS_1>$dominates$<SL_2,CS_2>$IFF $SL_1 \geq SL_2$ and $CS_1 \supseteq CS_2$.

A subject, i.e. a user, can read an object only if the label associated with the subject dominates the label associated with the object, that is the subject is trustworthy enough and has the legitimate need to read the object. Trustworthiness means that the chance that the subject intentionally leaks the information is low. The legitimate need of a subject to access the information in the object means that there is no unnecessary exposure of the information. Such an unnecessary exposure can lead to an unintentional leakage, and the organization is not willing to accept this type of risk.

This basic environment does not support risk-adaptive access control using quantified risk estimates. However, the environment does provide the foundation to enable such access control with proper initial settings as described below. It has been a common practice for government agencies, defense contractors and other organizations handling sensitive information to set up such an environment to practice MLS in order to control access to information.

Built on top of the basic environment, the initial setting enables risk-adaptive access control using quantified risk estimates by initializing the parameters of the Fuzzy MLS model. The Fuzzy MLS model is described in U.S. patent application Ser. No. 11/123,998 filed May 6, 2005. Fuzzy MLS is used to compute the quantified risk estimate associated with a human subject's read access to an object using the subject's and the object's MLS security labels as inputs. This ability to compute quantified risk estimates enables the organization to construct the risk scale depicted in FIG. 1. In Fuzzy MLS, risk associated with a human subject's access to a piece of information is defined as the expected value of loss incurred through an unauthorized disclosure of the object's information by the human subject. The loss is counted using a certain amount of risk units. Suitable risk units include, but are not limited to, monetary units and any unit that represents value to the organization.

In one embodiment, initializing the Fuzzy MLS system includes initialization of the parameters in the following equation to compute a risk index (RI).

$$RI_{SL}(sl,ol) = (a^{-(sl-ol)})/(m-ol) \qquad (1)$$

The parameters to be initialized are a and m, and ol and sl are the sensitivity levels of the object and subject respectively. The term $a^{ol}$ should correspond to the estimated value of loss if the object is disclosed without authorization. The term $a^{sl}$ should correspond to the trustworthiness placed on the human subject. For example, a could be 10, and $a^{ol}$ is the order of magnitude of loss. For $a^{sl}$, a given human subject can be trusted with objects whose unauthorized disclosure would cause damage on the order $a^{sl}$. Therefore, if a risk unit is one dollar, sl is 7 and a is 10, the subject can be trusted with objects whose disclosures result in damages up to, but no more than, the order of 10 million ($10^7$) dollars.

The parameter m reflects an upper bound on object sensitivity level allowed in the system. If the unauthorized disclosure of an object is deemed to result in damage comparable to or larger than $a^m$, then access to the object is controlled by a live administrator and not through automation such as using a computer to make the access control decision.

The following formula computes a probability of unauthorized disclosure from a risk index.

$$\text{Prob}_D(RI)=1/(1+\exp((-k)\times(RI-\text{mid}))) \quad (2)$$

The parameters to be initialized are k and mid. RI is a risk index. The parameter mid is the value of the risk index that computes to the probability one half (0.5 or 50%). The parameter k determines how fast the probability increases as RI increases. If formula (2) is used to compute a probability of unauthorized disclosure with a risk index computed from formula (1), this probability is called the "probability of unauthorized disclosure due to temptation", or due to the human subject being tempted. We denoted this probability $P_1$.

In addition to unauthorized disclosure resulting from temptation of a subject to disclose the information, objects or information can be disclosed inadvertently. The probability of disclosure due to inadvertent disclosure is denoted $P_2$. Unlike $P_1$ which is a result of temptation, $P_2$ is a result of carelessness or a "slip of the tongue". These occurrences are possible given the imperfection of humans. If the probability of "slip of tongue" is $P_{SOT}$, then $P_2$ is defined to be the difference between $P_{SOT}$ and a probability that the organization has identified that it is willing to accept as the cost of conducting its business. The degree of "willingness to accept" can be inferred from how strong a legitimate need the human subject has to access the object. For example, if the human subject has a strong, legitimate need to access the object, then the "willingness to accept" is high, i.e. close to $P_{SOT}$, and $P_2$ should be close to zero. If the subject only has a marginal need to access the object, then the "willingness to accept" is small or close to zero, and $P_2$ is close to $P_{SOT}$.

For access to information in a category C, the "unwillingness to accept", designated $UW_C$, is given a quantified estimate by comparing the relevance of the subject and the object to C. In one embodiment, the relevance to C can be represented as a fuzzy membership in C. This membership is a number between 0 and 1. A subject's membership indicates how strong of a legitimate need the subject has to access information in C. An object's membership indicates how relevant to C is the information in the object. For example, an un-willingness index for a given category C increases as the relevance of the subject decreases and the relevance of the object increases. This relationship is expressed by the following formula.

$$UW_C(r_s,r_o)=(r_o/r_s)/\log_{10}((M)/r_o) \quad (3)$$

In this equation, $r_s$ and $r_o$ are subject and object relevance to C. M is a tunable parameter that is larger than 1. The larger the value of M, the slower $UW_C$ increases as $r_o$ increases. $UW_C$ can be used in place of RI in formula (2) to compute the un-willingness, which would be a number between zero and one. To compute $P_2$, $P_{SOT}\times$"unwillingness" is computed for every category, and $P_2$ is computed as the maximum among all $P_{SOT}\times$"unwillingness". This example is only one of many possibilities to compute $P_2$, and there are many other possibilities. Below is a simpler, table-based set-up to compute $P_2$.

In one embodiment, the object relevance $r_o$ is made to be one for any category to which the object has some relevance. The object relevance $r_o$ is made to be zero for any category to which the object has no relevance. The probability $P_{SOT}$ is determined for each and every category. $P_{SOT}$ should be higher for a category that is meant to be associated with objects containing more sensitive information. For a human subject, that subject's relevance to each and every category is determined. The relevance to a given category should be higher if the subject has a strong need to access objects relevant to that category. A table is constructed to record the mapping from subject relevance to unwillingness. In one embodiment, this table reflects, for example, that the unwillingness is 0% if the subject relevance is between 0.91 and 1.00, the unwillingness is 10% if the subject relevance is between 0.81 and 0.90 and the unwillingness is 100% if the subject relevance is between 0.00 and 0.10. When a subject requests access to an object, $P_{SOT}\times$"unwillingness" is computed for every category to which the object has some relevance. The unwillingness is determined from the table using the subject's relevance to the category. The maximum $P_{SOT}\times$"unwillingness" among these relevant categories is chosen to be $P_2$.

The risk, or "expected value of loss incurred through an unauthorized disclosure of this object's information by the human subject" is:

$$\text{risk}=a^{ol}\times(P_1+P_2-P_1\times P_2) \quad (4)$$

In equation (4), ol is the sensitivity level of the object.

In one embodiment, the initial setting also includes defining the boundaries of the risk bands in FIG. 1 and any mitigation measures associated with each band. The total amount of risk, i.e. the overall risk tolerance, that the organization is willing to take with regard to unauthorized information disclosure is determined. In one embodiment, this amount is represented as a number of risk units. The risk unit is used by Fuzzy MLS. Having determined the total amount of risk and hence the total number of risk units, the mechanism under which these risk units are allocated to each one of the plurality of subjects, e.g., the organization's employees, is determined. The total amount of allocation to all subjects is less than or equal to the overall risk tolerance. Risk units allocated to a given subject enable that subject to access information using these risk units in accordance with embodiments of the risk-adaptive access control system of the present invention.

A risk account management system tracks the amount of risk units possessed by each subject. These amounts change over time as subjects use risk units to acquire access to objects. In one embodiment, the risk account management system includes a data base. Transactions are performed on the data base to add or deduct risk units from accounts associated with the subjects. In one embodiment, where a free market allocation model is used, the risk account management system maintains records for both risk units and currency units associated with each subject, including the initial allocations of risk units and currency for each subject. In one embodiment where the reputation of each subject is used for risk unit allocation, the present invention also includes a reputation management system.

In one embodiment, the results derived from access to objects by a subject are linked to an award for that subject and to future allocations of risk units to that subject. For example, a subject that takes a calculated risk and delivers valuable results to benefit the organization is well rewarded and is allocated more risk units to facilitate additional risk taking by that subject.

In general, the determination of an overall risk tolerance level for the organization and an initial allocation of risk units among the subjects of the organization is accomplished with input from both security experts and the management of the organization. The risk tolerance level and allocations can be tuned over time as needed.

Figure 2:
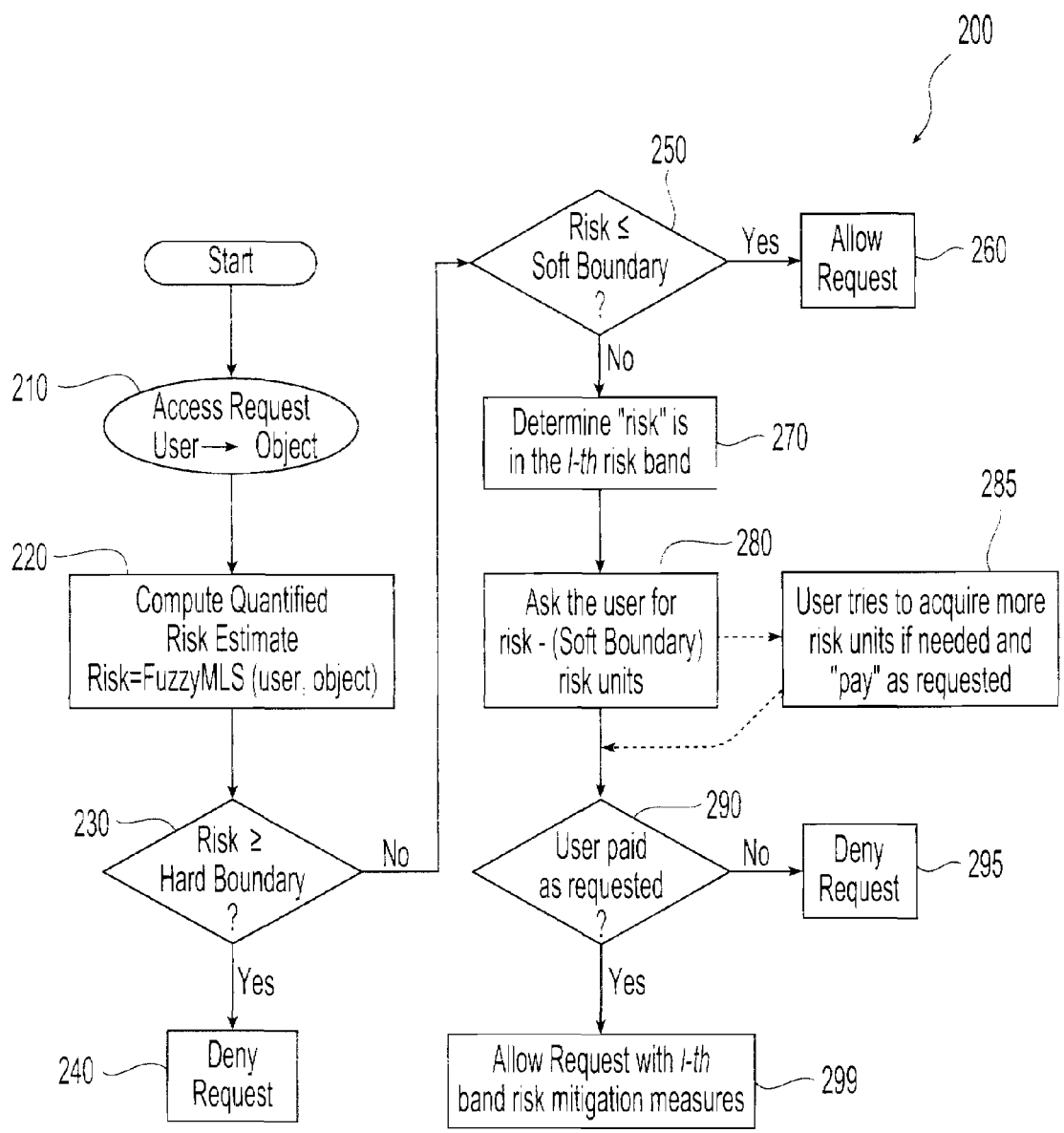
FIG. 2 is a flow chart illustrating an embodiment of a method for access control risk management in accordance with the present invention.

Referring to FIG. 2, an exemplary embodiment of a method for quantified risk adaptive access control in accordance with the present invention is illustrated. As illustrated, a computer system operated by the organization implements quantified risk adaptive access control using the parameters determined in the initial setting by the organization. With the exception of the step where a user tries to acquire more risk units 285, all actions are performed by the computer system, i.e. the organization. Initially, a request from a subject or user to access an object is communicated to an access control mechanism 210 within the computing system. In response to the request, the risk estimation mechanism within the computing system computes a quantified risk estimate associated with the requested access 220. Preferably, the risk estimation mechanism uses Fuzzy MLS to compute the quantified risk estimate associated with the requested access using the MLS security labels associated with the subject and the object as input.

Having computed a risk estimate for the access request, this risk estimate is compared to the prescribed hard boundary 230 for the risk scale applicable to organization. If the quantified risk estimate computed is greater than or equal to the hard boundary specified in the initial setting, then the access request is denied 240. If the quantified risk estimate is less than the hard boundary, the quantified risk estimate is then compared to the lower soft boundary 250 for the risk scale applicable to the organization. If the quantified risk estimate is less than or equal to the soft boundary specified in the initial setting, then the requested access is allowed 260. If the quantified risk estimate is not less than or equal to the soft boundary specified in the initial setting, then the risk estimated falls in a risk band between the upper hard boundary and the lower soft boundary.

Therefore, a determination is made as to which risk band on the risk scale the quantified risk estimate belongs 270. In one embodiment, this band is denoted as the $i^{th}$ band. The boundaries of risk bands are determined during the initial setting. Each risk band has an associated number of risk units required for object access requests that fall within that band. Preferably, the number of risk units associated with a given band are sufficient to decrease the quantified risk estimate to a level less than or equal to the lower soft boundary, i.e. (quantified risk estimate−soft boundary). Having identified the risk band in which the access belongs and knowing the risk units associated with that band, a request 280 is communicated to the subject for the required number of risk units. In a centralized, top-down risk unit allocation, the user would then obtain the required number of units from its risk unit allocation if its risk unit allocation contains a sufficient amount of risk units. In a request and response or free-market risk unit allocation, the user would examine its current number or initial allocation of risk units. If the number of available risk units is less than the required number of risk units, then the user attempts to acquire a sufficient number of additional risk units 285, either by requesting these units from a centralized source, acquiring these units from other users in the open market or pooling units with other users. The acquisition of additional units may also require that the user pay additional fees or costs as prescribed for risk unit transfer.

The computing system then checks to see if the user has proffered the required number of risk units 290. If the user "pays" the risk units requested, the requested access 299 is allowed with the risk mitigation measures associated with the $i^{th}$ risk band being taken against the access as well. In one embodiment, a user pre-deposits an amount of risk units for the access request when the request is made, and the amount of risk units requested is checked against the pre-deposited amount. If the deposited amount is less, then the request is denied. If the pre-deposited amount is sufficient, the requested amount of risk units is deducted from the pre-deposit amount, and the requested access is allowed with the risk mitigation measures associated with the $i^{th}$ risk band be taken against the access as well. After the requested amount is deducted from the pre-deposited amount, any remaining risk units are returned to the user.

A variety of embodiments are suitable for allocating risk units among a plurality of users, for example employees within an organization. In general, the total amount of risk units allocated to all users is less than or equal to the overall risk tolerance of the organization as determined in the initial setting. In one embodiment, a centralized, pre-planned method is used for risk unit allocation. The organization, using its knowledge and best judgment, determines how much risk each user is allowed to take by assigning the user a fixed number of risk units that can be used by the user to access information. In another embodiment, risk units are allocated in response to requests from users. For example, a user determines how many risk units are needed to perform an assigned task and requests these units from the organization. The request is accompanied by a justification for the access and risk unit allocation. The organization and in particular the management of the organization either allows or denies the request. In one embodiment, risk unit allocation is accomplished using a free market mechanism. The organization determines the total amount of risk units and an initial allocation of these units among all users. Each user determines the objects that need to be accessed and acquires the required amount of risk units from this initial allocation and the market as needed so the access can be allowed. A given user can buy or sell risk units through the market using a currency. Users are encouraged to sell or to trade excess risk units.

Systems and methods in accordance with the present invention encourage users to be prudent and to take calculated risks in order to deliver good results that benefit the organization. In one embodiment, the reputation of a given subject or user is considered when allocating risk units. For example, the risk units allocated to an employee are based on the reputation associated with that employee. A stronger reputation warrants a larger allocation. The reputation of a given user is based on how valuable the results obtained by the user are to the organization and how helpful the user is to other users within the organization. In one embodiment, user reputation is maintained by a reputation management mechanism. Suitable reputation management mechanisms include peer-review systems through which each user can submit scores to rank the performance of other users.

In one embodiment, systems and methods in accordance with the present invention utilize result evaluation and fine tuning. The purpose of result evaluation and fine tuning is to influence user behavior in order to encourage prudent risk taking and thus deliver optimal results for the organization. The basic principle is that users demonstrating the ability to take calculated risks to deliver good results are rewarded and are given bigger allocations of risk units to take even more risk. Thus, result evaluation enables an organization to fine tune its risk allocation among its users. In one embodiment, result evaluation is conducted periodically as part of an ongoing user performance evaluation that organization always conducts. Alternatively, risk evaluation is conducted continuously using a user reputation management mechanism.

If risk unit allocation includes a market exchange mechanism, then the evaluation of the results of a given user is represented as a certain amount of currency that is credited to the user. To encourage prudent risk taking, there is a direct relationship between the amount of currency each user holds and the tangible, real benefit for the user. For example, the organization can link the amount of currency that the user holds directly to monetary awards for the user. If the risk unit allocation is based on user reputation, then a reputation score for that user can be considered during the evaluation of the user. The reputation score is linked directly to a tangible, real benefit for the user.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution.

Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for risk adaptive information flow based access control in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:
1. A method for access control, the method comprising:
  creating a hierarchical risk scale by:
    creating a high risk band comprising risk above an upper risk boundary;
    creating a low risk band comprising risk below a lower risk boundary, the low risk bank separate from the high risk band; and
    creating a plurality of intermediate risk bands located between the high risk band and the low risk band, the plurality of intermediate risk bands comprises more than two intermediate risk bands and each intermediate risk band comprising a given range of risk between the upper risk boundary and the lower risk boundary;
  estimating a risk based on objects accessed and security attributes of accessing subjects, wherein the risk comprises countable and allocable units of a total amount of risk for unauthorized information disclosure for all objects accessed by all accessing subjects that is tolerated and comprises an expected value of loss incurred through unauthorized disclosure of objects by subjects, and wherein, the expected risk of loss increases from the lower risk boundary to the upper risk boundary;
  associating a unique access request decision with each risk band;
  determining a risk estimate associated with access of a given object by a given subject;

locating the risk estimate in one of the high risk band, plurality of intermediate risk bands and the low risk band; and applying the access request decision associated with the risk band in which the risk estimate is located and any desired units of the total amount of risk allocated to the given subject to the access of the given object by the given subject.

2. The method of claim 1, wherein associating the access request decision with each risk band further comprises:
associating a deny access request decision with the high risk band;
associating a allow access request decision with the low risk band; and
associating a allow access request with mitigation measures to each one of the plurality of intermediate risk bands.

3. The method of claim 2, wherein the mitigation measures are sufficient to decrease a risk level associated with the access of the given object by the given subject to a level less than or equal to the lower risk boundary.

4. The method of claim 2, wherein the mitigation measures comprise application sandboxing or charging an associated risk level to an amount of risk units allocated to the given subject.

5. The method of claim 1, wherein determining the risk estimate further comprises:
assigning to the given subject a degree of trust and categories of objects to which the given subject has a legitimate need to access; and
assigning to the given object a magnitude of damage caused by unauthorized access to the given object and categories of objects to which the given object belongs.

6. The method of claim 5, wherein determining the risk estimate further comprises calculating a risk index as a function of the degree of trust assigned to the given object and the magnitude of damage caused by unauthorized access to the given object.

7. The method of claim 6, wherein determining the risk estimate further comprises:
computing the probability of unauthorized disclosure of the given object by the given subject as a function of the risk index; and
computing the probability of inadvertent disclosure of the given object by the given subject.

8. The method of claim 7, wherein computing the probability of inadvertent disclosure further comprises calculating the difference between a carelessness probability and degree of willingness to accept probability.

9. The method of claim 7, wherein computing the probability of inadvertent disclosure further comprises:
calculating for each category of objects a product of a carelessness probability and an unwillingness comprising a measure of a need of the given subject to access information in a given category of objects and a relevance of the given object to the given category of objects; and
using a maximum calculated product as the probability of inadvertent disclosure.

10. The method of claim 7, wherein determining the risk estimate further comprises computing the estimated risk as a function of the probability of unauthorized disclosure and the probability of inadvertent disclosure.

11. A non-transitory computer-readable medium containing a computer-readable code that when read by a computer causes the computer to perform a set of steps for access control, the steps comprising:

creating a hierarchical risk scale by:
creating a high risk band comprising risk above an upper risk boundary;
creating a low risk band comprising risk below a lower risk boundary, the low risk bank separate from the high risk band; and
creating a plurality of intermediate risk bands located between the high risk band and the low risk band, the plurality of intermediate risk bands comprises more than two intermediate risk bands and each intermediate risk band comprising a given range of risk between the upper risk boundary and the lower risk boundary;
estimating a risk based on objects accessed and security attributes of accessing subjects, wherein the risk comprises countable and allocable units of a total amount of risk for unauthorized information disclosure for all objects accessed by all accessing subjects that is tolerated and comprises an expected value of loss incurred through unauthorized disclosure of objects by subjects, and wherein, the expected risk of loss increases from the lower risk boundary to the upper risk boundary;
associating a unique access request decision with each risk band;
determining a risk estimate associated with access of a given object by a given subject;
locating the risk estimate in one of the high risk band, plurality of intermediate risk bands and the low risk band; and
applying the access request decision associated with the risk band in which the risk estimate is located and any desired units of the total amount of risk allocated to the given subject to the access of the given object by the given subject.

12. The non-transitory computer-readable medium of claim 11, wherein associating the access request decision with each risk band further comprises:
associating a deny access request decision with the high risk band;
associating a allow access request decision with the low risk band; and
associating a allow access request with mitigation measures to each one of the plurality of intermediate risk bands.

13. The non-transitory computer-readable medium of claim 12, wherein the mitigation measures are sufficient to decrease a risk level associated with the access of the given object by the given subject to a level less than or equal to the lower risk boundary.

14. The non-transitory computer-readable medium of claim 12, wherein the mitigation measures comprise application sandboxing or charging an associated risk level to an amount of risk units allocated to the given subject.

15. The non-transitory computer-readable medium of claim 11, wherein determining the risk estimate further comprises:
assigning to the given subject a degree of trust and categories of objects to which the given subject has a legitimate need to access; and
assigning to the given object a magnitude of damage caused by unauthorized access to the given object and categories of objects to which the given object belongs.

16. The non-transitory computer-readable medium of claim 15, wherein determining the risk estimate further comprises calculating a risk index as a function of the degree of trust assigned to the given object and the magnitude of damage caused by unauthorized access to the given object.

17. The non-transitory computer-readable medium of claim 16, wherein determining the risk estimate further comprises:
- computing the probability of unauthorized disclosure of the given object by the given subject as a function of the risk index; and
- computing the probability of inadvertent disclosure of the given object by the given subject.

18. The non-transitory computer-readable medium of claim 17, wherein computing the probability of inadvertent disclosure further comprises calculating the difference between a carelessness probability and degree of willingness to accept probability.

19. The non-transitory computer-readable medium of claim 17, wherein computing the probability of inadvertent disclosure further comprises:
- calculating for each category of objects a product of a carelessness probability and an unwillingness comprising a measure of a need of the given subject to access information in a given category of objects and a relevance of the given object to the given category of objects; and
- using a maximum calculated product as the probability of inadvertent disclosure.

20. The non-transitory computer-readable medium of claim 17, wherein determining the risk estimate further comprises computing the estimated risk as a function of the probability of unauthorized disclosure and the probability of inadvertent disclosure.

* * * * *